(12) United States Patent
Ryan et al.

(10) Patent No.: US 8,424,900 B2
(45) Date of Patent: Apr. 23, 2013

(54) STROLLER TRAYS AND METHODS OF MOUNTING THE SAME ON STROLLERS

(75) Inventors: Christine A. Ryan, Chicago, IL (US); Rachel Fine, Reston, VA (US); Ross Carl, River Forest, IL (US); Chen Er-Jui, Guang Dong (CN); Iftinca Ioan Liviu, Chicago, IL (US); Matthew James Oblak, Chicago, IL (US); Wesley E. Thomas, Kenosha, WI (US)

(73) Assignee: Kolcraft Enterprises, Inc., Chicago, IL (US)

( * ) Notice: Subject to any disclaimer, the term of this patent is extended or adjusted under 35 U.S.C. 154(b) by 1080 days.

(21) Appl. No.: 12/105,645

(22) Filed: Apr. 18, 2008

(65) Prior Publication Data
US 2009/0039620 A1 Feb. 12, 2009

Related U.S. Application Data

(60) Provisional application No. 60/913,141, filed on Apr. 20, 2007.

(51) Int. Cl.
*B62B 5/00* (2006.01)
(52) U.S. Cl.
USPC .......................... 280/647; 280/658; 297/161
(58) Field of Classification Search .............. 280/42, 280/47.38, 642, 647, 649, 650, 657, 658; 297/16.2, 56, 160, 161, 162, 194, DIG. 4
See application file for complete search history.

(56) References Cited

U.S. PATENT DOCUMENTS

| | | | | |
|---|---|---|---|---|
| 3,586,367 A | * | 6/1971 | Cincotta | 297/162 |
| 4,662,676 A | * | 5/1987 | Havelock | 297/160 |
| 4,856,809 A | | 8/1989 | Kohus et al. | |
| D305,522 S | | 1/1990 | Kohus et al. | |
| 4,892,327 A | * | 1/1990 | Cabagnero | 280/650 |
| 5,139,309 A | * | 8/1992 | Kornreich | 297/162 |
| 5,382,074 A | | 1/1995 | Pietra | |
| 5,437,493 A | | 8/1995 | Weisleder | |
| 5,458,394 A | | 10/1995 | Nichols et al. | |
| 5,503,297 A | * | 4/1996 | Frankel | 220/751 |
| 5,573,301 A | * | 11/1996 | Scott | 297/173 |
| 5,816,648 A | | 10/1998 | Baccili et al. | |

(Continued)

FOREIGN PATENT DOCUMENTS

GB 2384687 8/2003

OTHER PUBLICATIONS

The State Intellectual Property Office of China, "Second Office Action," issued in connection with Chinese application serial No. 200810100324.7, issued Nov. 15, 2011, 7 pages.

*Primary Examiner* — J. Allen Shriver, II
*Assistant Examiner* — Bridget Avery
(74) *Attorney, Agent, or Firm* — Hanley, Flight & Zimmerman, LLC

(57) ABSTRACT

Stroller trays and methods of mounting the same on strollers are disclosed. An example stroller tray mates with a tray mount mounted to the stroller frame proximate a seat. The example tray includes a tray portion and an arm. The tray portion is cantilevered on the arm to extend in front of or over a portion of the seat. When mounted to the stroller, the stroller tray does not extend completely from one side of the stroller frame to the other to facilitate egress to the stroller seat.

25 Claims, 12 Drawing Sheets

U.S. PATENT DOCUMENTS

| | | | |
|---|---|---|---|
| 5,865,124 A * | 2/1999 | Wroe | 108/26 |
| 5,964,501 A | 10/1999 | Magnani | |
| 6,302,033 B1 | 10/2001 | Roudebush | |
| D470,803 S | 2/2003 | Hansen | |
| 6,843,498 B2 * | 1/2005 | Bretschger et al. | 280/642 |
| 7,134,714 B1 | 11/2006 | Connery | |
| 7,614,640 B2 * | 11/2009 | Dean et al. | 280/642 |
| 7,845,671 B2 * | 12/2010 | Cone, II | 280/650 |
| 2006/0214397 A1 | 9/2006 | Dotsey et al. | |
| 2008/0041282 A1 * | 2/2008 | Goschy et al. | 108/141 |

* cited by examiner

STROLLER TRAYS AND METHODS OF MOUNTING THE SAME ON STROLLERS

CROSS REFERENCE TO RELATED APPLICATION

This application is a non-provisional application claiming priority from U.S. Provisional Application Ser. No. 60/913,141, filed Apr. 20, 2007, entitled "Stroller Trays and Methods of Mounting the Same on Strollers" and incorporated herein by reference in its entirety.

FIELD OF THE DISCLOSURE

This disclosure relates generally to child care products, and, more particularly, to stroller trays and methods of mounting such stroller trays on strollers.

BACKGROUND

Conventional infant strollers are known in the art. Typically, infant strollers include a stroller frame having a first side frame and a second side frame spaced laterally from the first side frame and supporting a seat for a child to ride in. The stroller frames are usually foldable in at least one direction to allow the stroller to collapse to a folded position. Strollers oftentimes include a tray assembly attached to the stroller and extending from one side of the stroller frame to the other and across the seating area to provide a child with a convenient tray surface, to provide entertainment, and/or to act as a passive restraint to maintain the child in the seating area.

DETAILED DESCRIPTION

Figure 1:
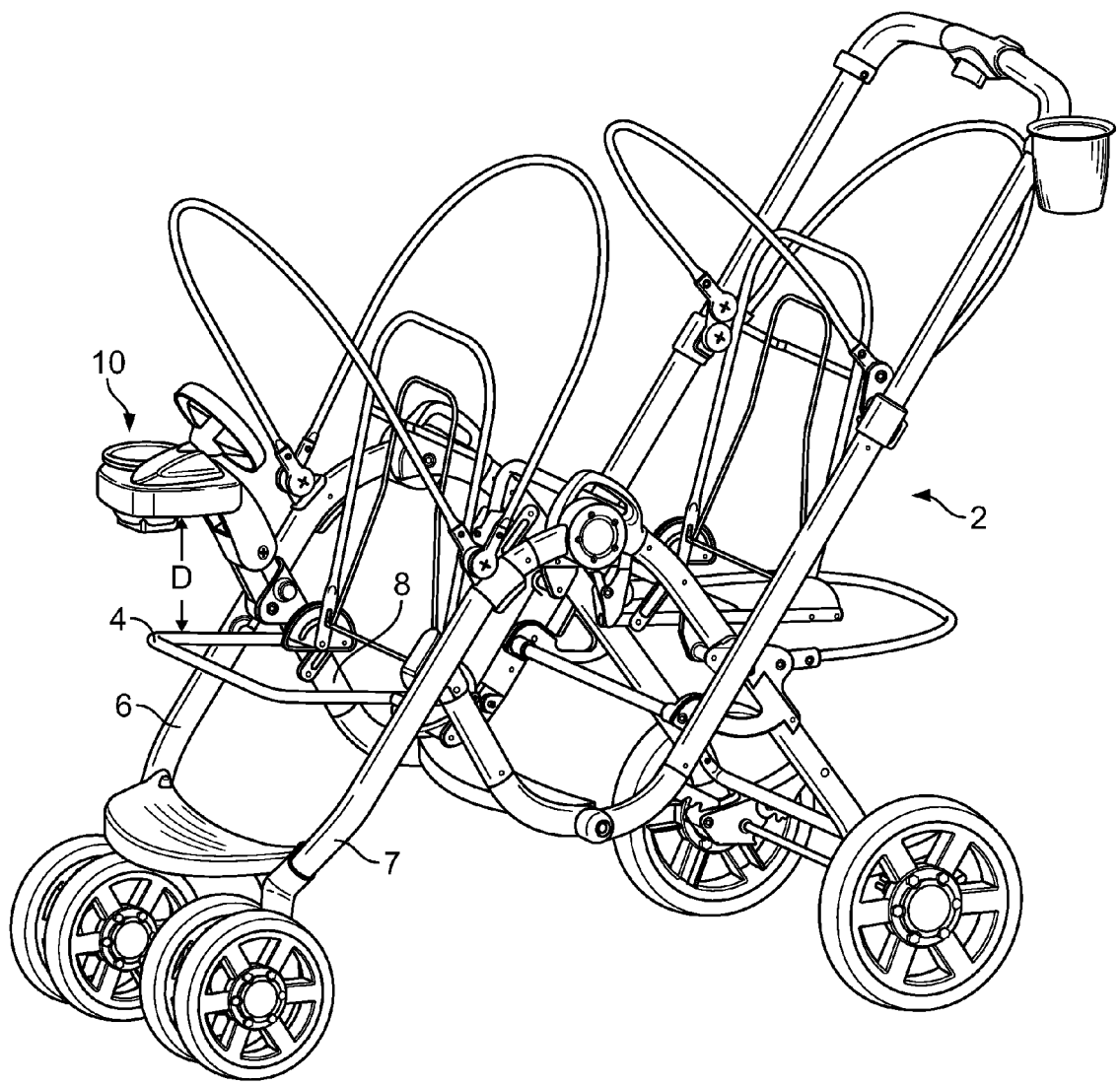
FIG. 1 is a left side, front perspective plan view of an example stroller tray mounted on an example stroller.
Figure 2:
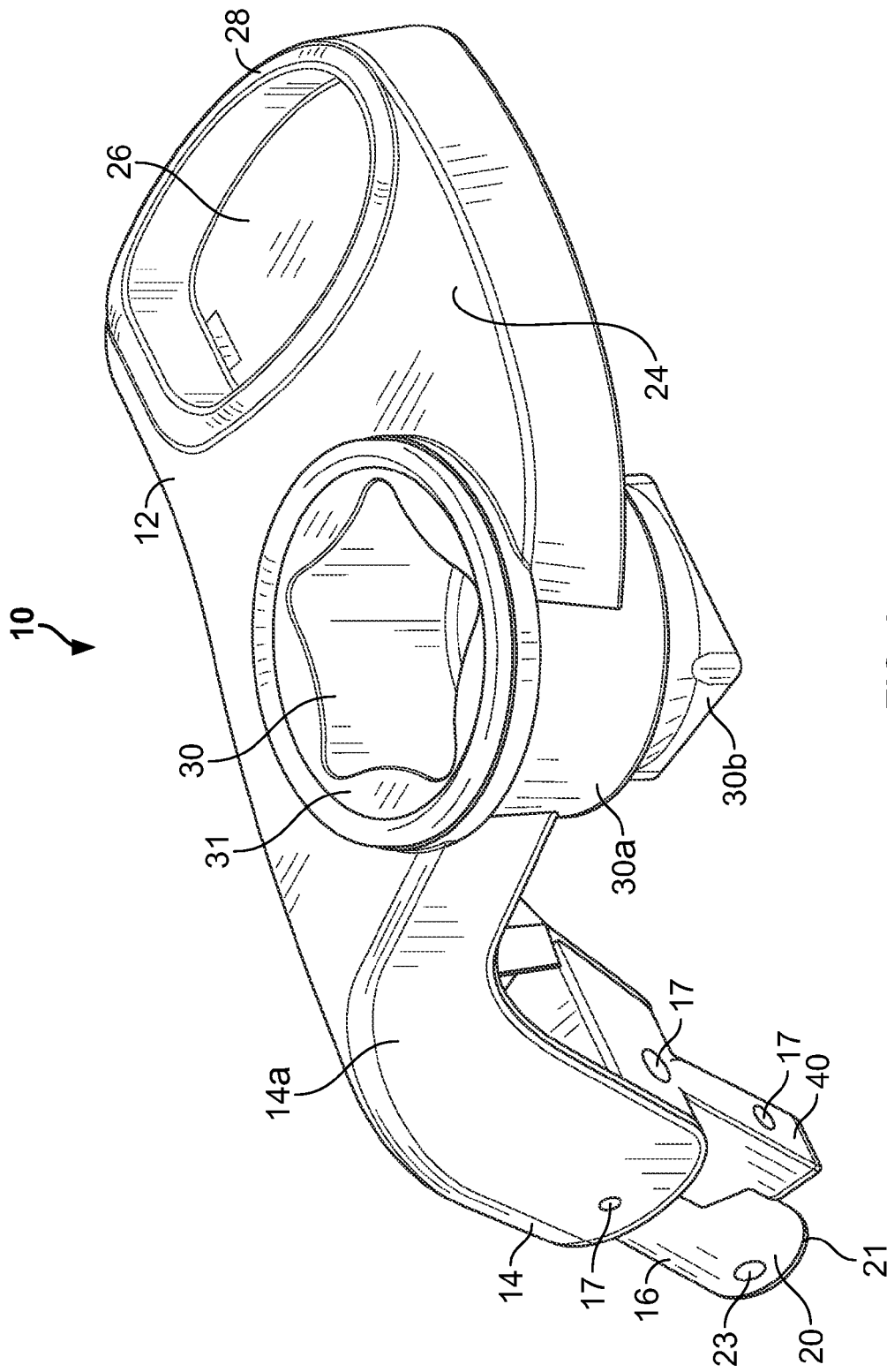
FIG. 2 is a right side, front perspective view of the example stroller tray of FIG. 1.
Figure 3:
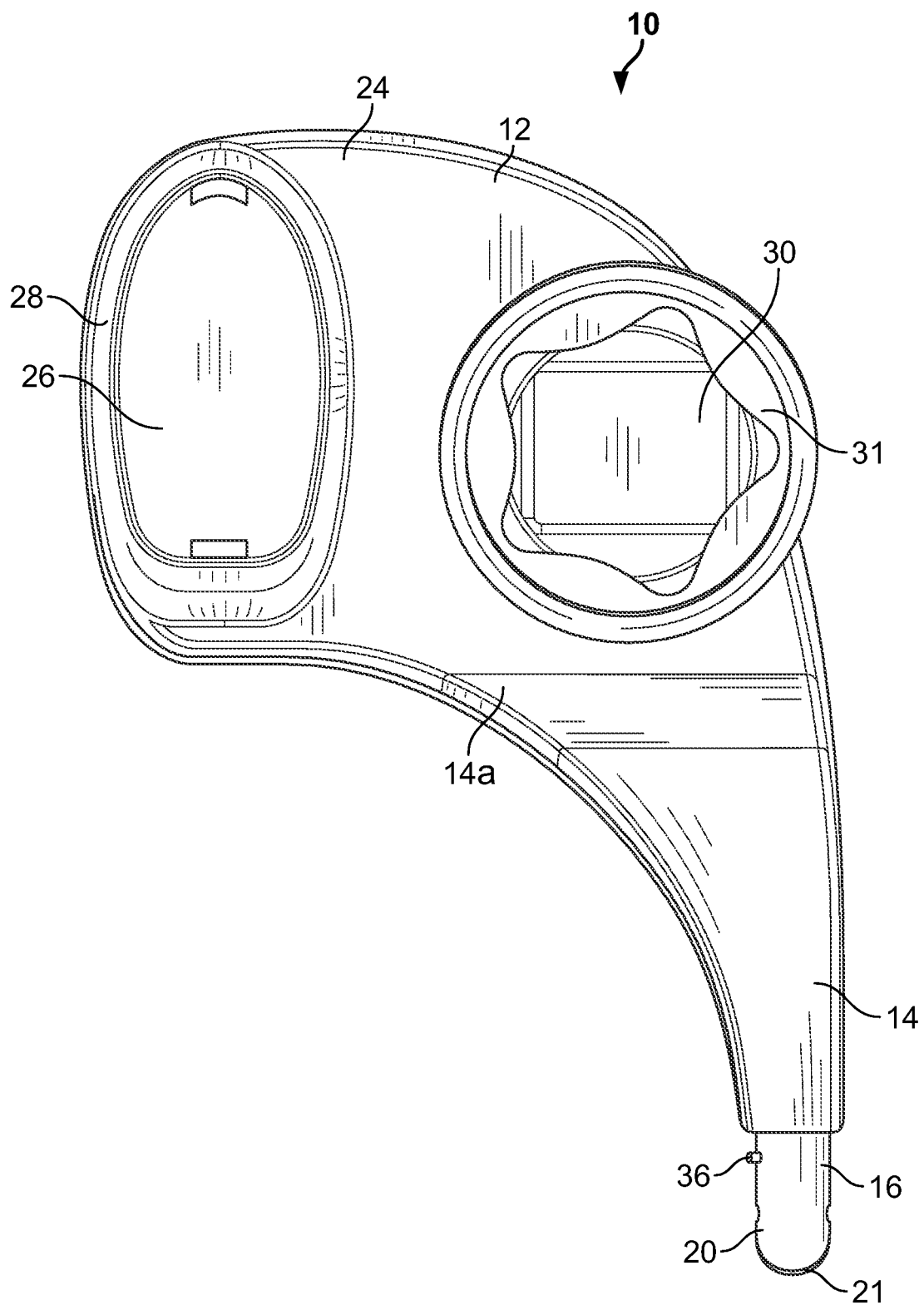
FIG. 3 is a top plan view of the example stroller tray of FIG. 1.
Figure 4:
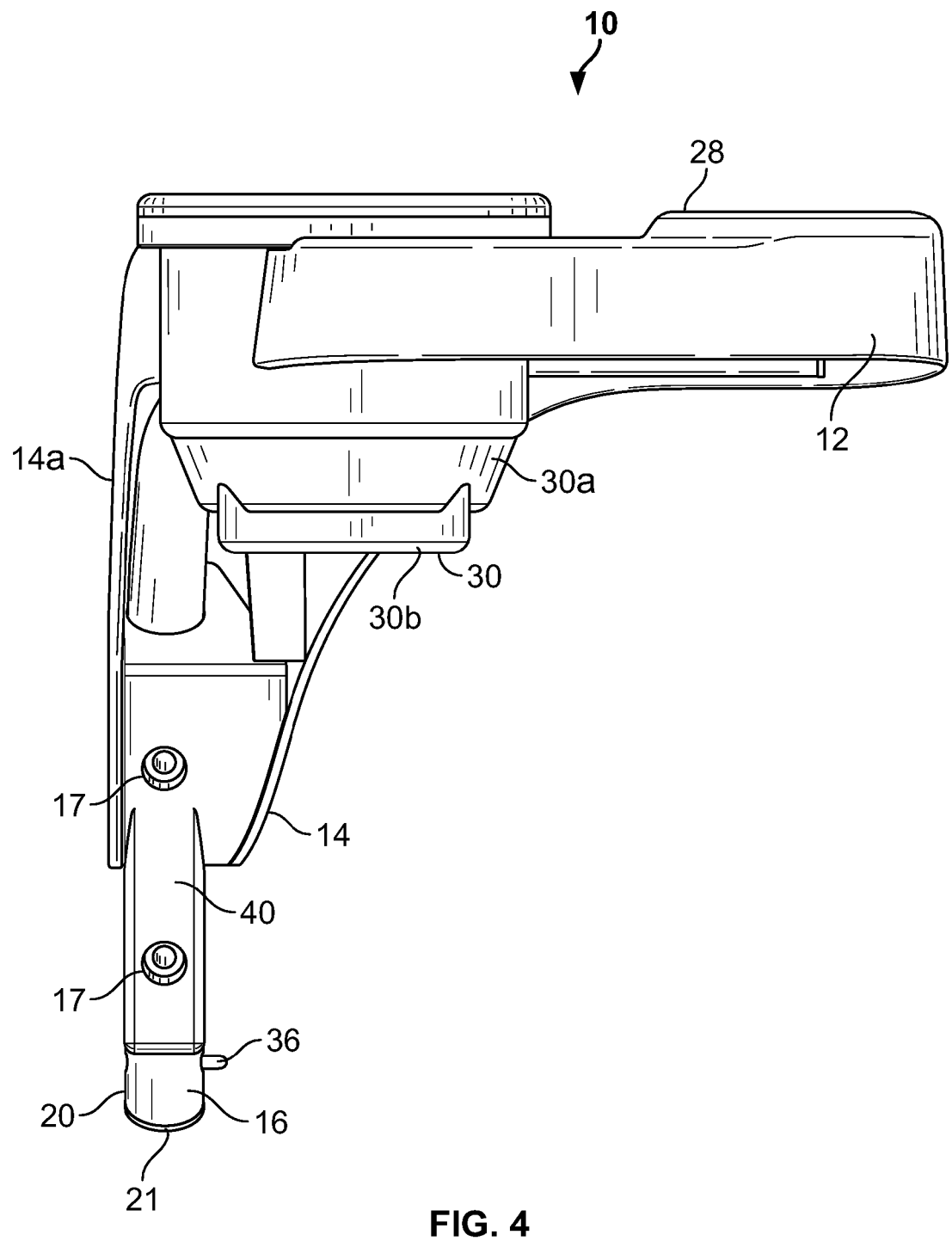
FIG. 4 is a front view of the example stroller tray of FIG. 1.
Figure 5:
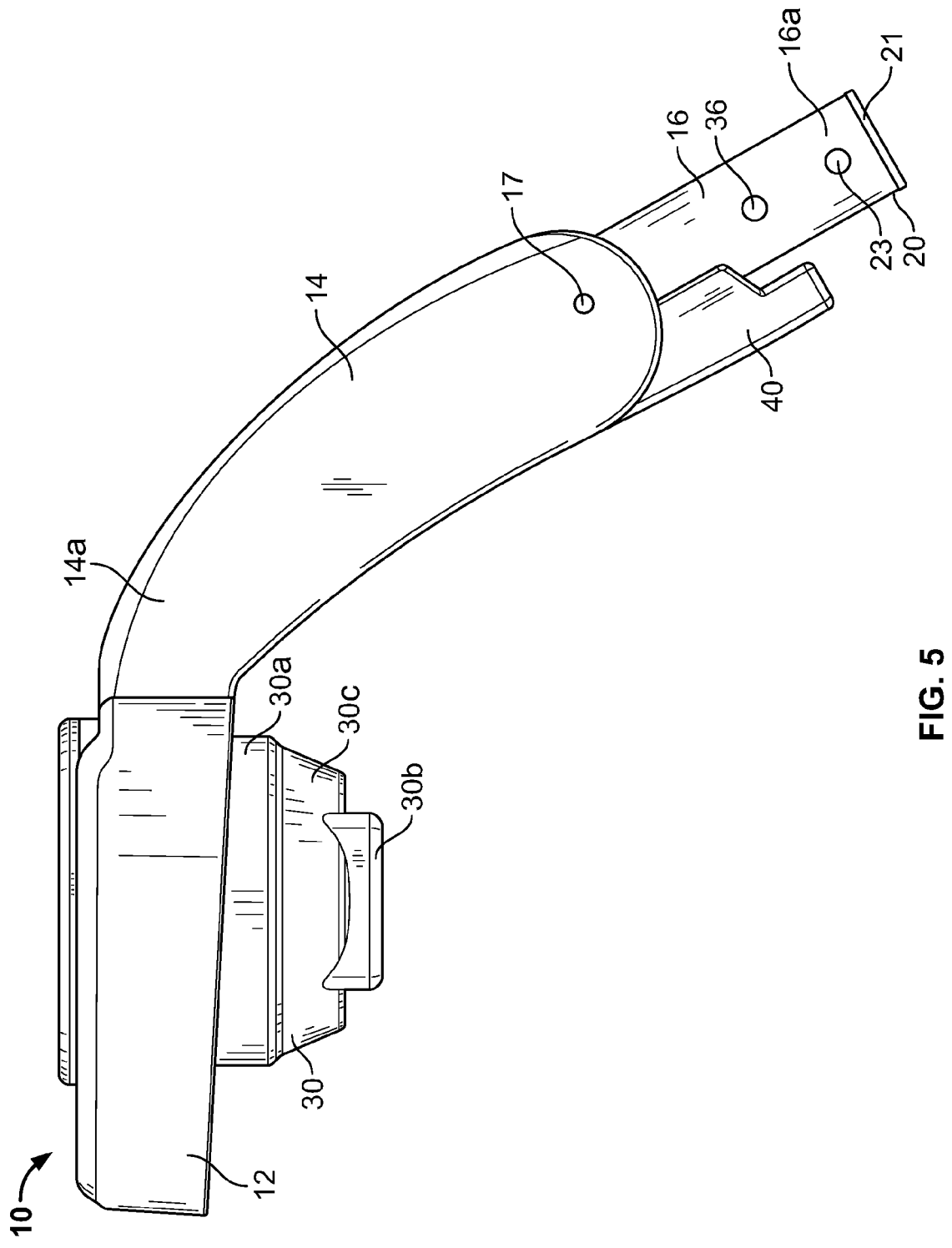
FIG. 5 is a left side view of the example stroller tray of FIG. 1.
Figure 6:
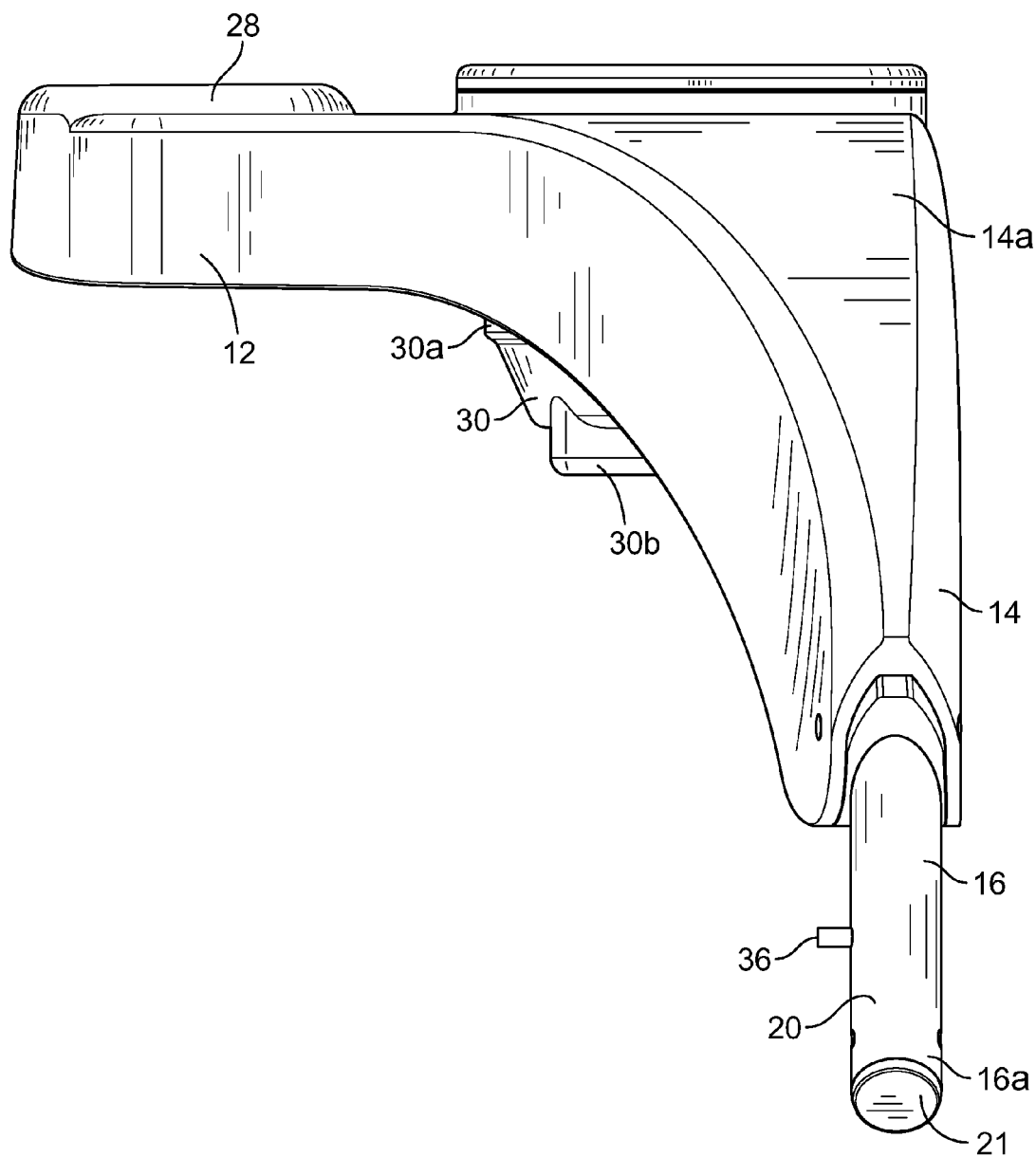
FIG. 6 is a rear view of the example stroller tray of FIG. 1.
Figure 7:
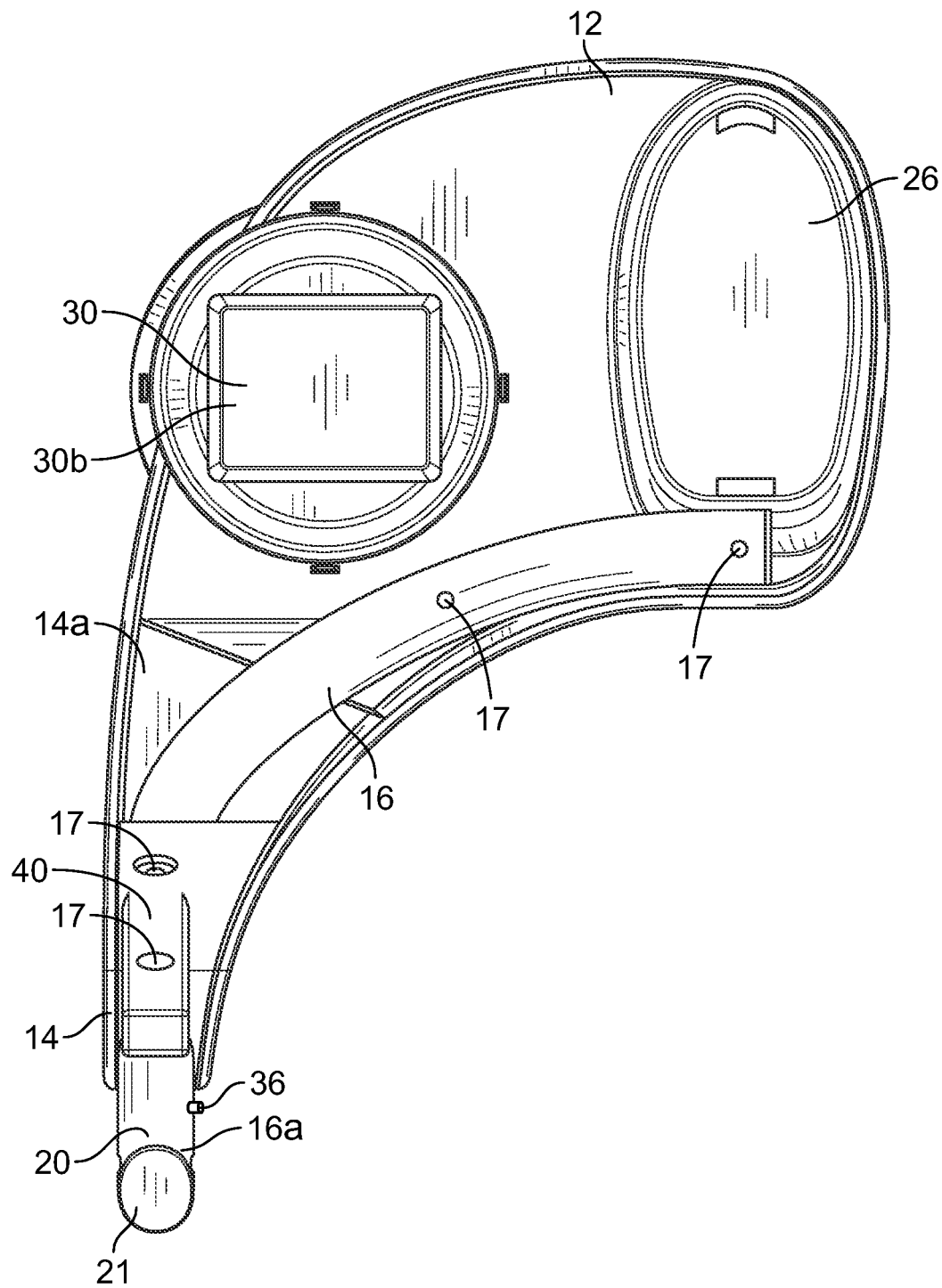
FIG. 7 is a bottom plan view of the example stroller tray of FIG. 1.

FIGS. 1-8 illustrate an example stroller tray 10 constructed in accordance with the teachings of the present disclosure and removably mountable to a stroller 2 having at least one seat 4. The stroller 2 includes a first side frame assembly 6 and a second side frame assembly 7 laterally spaced a distance from the first side frame assembly 6. In this example the distance between the side frames is approximately the width of the seat 4. Furthermore, the side frame assemblies 6, 7 are constructed such as to be moveable between an extending in-use configuration wherein the front and rear legs on a frame side are displaced a distance apart (FIG. 1) and a collapsed, folded, storage position wherein the front and rear legs are positioned in close proximity to one another (not shown). The seat 4 may be integrally formed with, mounted to, or separately attachable to the stroller 2 as desired. Although for purposes of illustration, the tray 10 is shown mounted on a particular tandem seat stroller 2, the precise construction of the stroller frame is immaterial. The tray 10 can be combined with any type of stroller.

The illustrated stroller tray 10 includes a tray portion 12 and an arm 14 having a first end 14a coupled to the tray portion 12. In this example, the tray portion 12 and arm 14 are integrally formed as a unitary body. A support arm 16 is fastened to an underside of the arm 14 and an underside of the tray portion 12 to couple the stroller tray 10 to the stroller 2 and/or to provide rigidity to the stroller tray 10. A plurality of rivets 17, or other suitable fastener, attaches the support arm 16 to the arm 14 and tray portion 12 (see FIG. 7). The support arm 16 may be any suitable shape. The illustrated example support arm 16 has a generally curvilinear shape, complementary to the shape of the underside of the arm 14 and the underside of the tray portion 12, and includes an oblong cross section, such as, for example, a generally oval or elliptical cross-sectional shape (see FIG. 7).

In this example, the support arm 16 forms a connector assembly 20 that is configured for removable engagement with a mount 22 on the stroller 2 (see FIG. 8), as will be described below in more detail. In the illustrated example, the tray portion 12 is cantilevered on the arm 14 to provide access to and from the seat 4 of the stroller 2. The tray portion 12 and arm 14 of the illustrated example are constructed of molded plastic, while the support arm 16 of the illustrated example is constructed of a metal. The components, however, may be constructed of any other suitable material(s).

As shown in FIG. 1, the stroller tray 10 is dimensioned to extend in front of and/or over a portion of the seat 4 of the stroller 2, but to not completely enclose the front of the seat 4. In this manner, the stroller tray 10 will extend in front of an occupant seated in the stroller 2, such as a small child. In this example, the distance D between the bottom of the tray portion 12 and the seat 4 of the stroller 2 is greater than four inches and less than eight inches.

As mentioned above, the stroller tray 10 does not extend completely from one side of the stroller 2 to the other, and, accordingly, is not mounted to both sides of the stroller 2. Instead, the tray 10 is cantilevered from one side frame of the stroller 2. As a result, the stroller tray 10 provides convenient ingress and egress from the stroller 2, even when the stroller tray 10 is in a use position. Thus, the illustrated example stroller tray 10 is mounted to the stroller 2 on only one side of the stroller 2 and extends approximately half the distance from one side of the stroller 2 to the opposite side.

Figure 9:
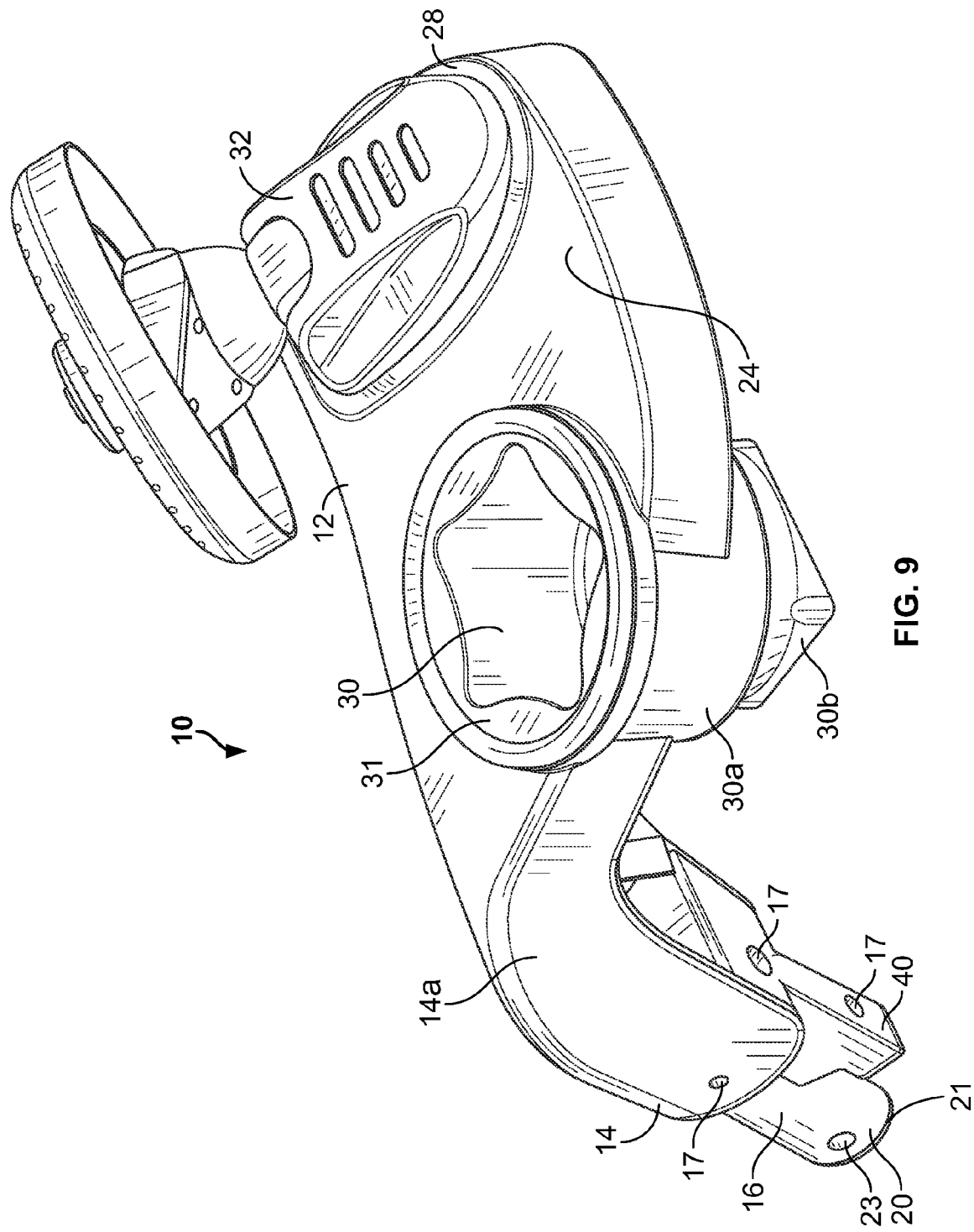
FIG. 9 is a right side front perspective view of the example stroller tray of FIG. 1, showing an attached toy accessory.

The example stroller tray 10 provides a surface 24 for holding objects. In the illustrated example, the surface 24 incorporates a recessed area 26 and a raised outer shoulder 28, and a recessed cup holder 30 or other compartment. In this example, the recessed cup holder includes a generally circular cross section portion 30a and a generally rectangular cross section portion 30b such that the cup holder 30 may hold a multitude of drink holders including circular and rectangular drink holders. As illustrated, the circular cross section portion 30b includes a reduced diameter portion 30c (see FIG. 5) to hold circular drink containers of various widths. Further, in this example, the recessed area 26 and the raised outer shoulder 28 may be utilized for locating an amusement device, such as a toy steering wheel 32 in front of and/or within the reach of a child (see FIG. 9). The cup holder 30 of the illustrated example includes an insert 31, such as a plastic insert to assist in retaining a cup therein.

Figure 8:
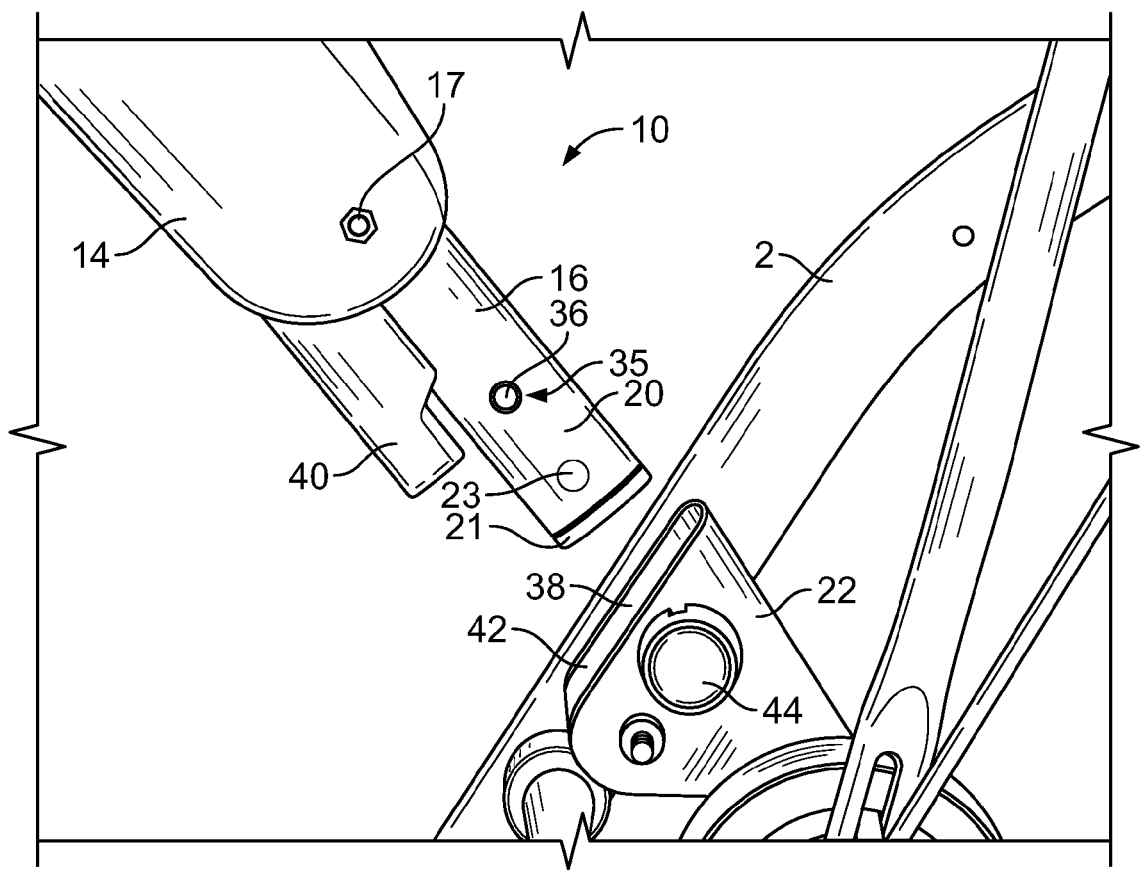
FIG. 8 is an enlarged left side view of the example stroller tray of FIG. 1, showing the tray released from the stroller.

Turning now to FIG. 8, the example stroller tray 10 is shown removed from the stroller 2. In particular, in the illustrated example, the connector assembly 20 includes an end plug 21 secured by a rivet 23, or other suitable securement method, and a retention plug assembly 35 including a spring-biased push button 36 such as a VALCO™ pin. The connector assembly 20 is dimensioned for mating engagement with the mount 22 on the stroller 2. In this example, the mount 22 is located at an upper end of a frame member 8 of the side frame 6 (See FIGS. 1 and 8). The mount 22 may, however, be located on any suitable stroller surface including, for instance, the seat 4. Furthermore, while the mount 22 is illustrated as located on the right side of the stroller 2, the mount 22 may be alternatively located on the left side of the stroller 2. The mount 22 includes a socket 38 for receiving the connector assembly 20 of the stroller tray 10. The socket 38 also includes an aperture in a side wall (not shown) to receive the push button 36 of the connector assembly 20 and to establish removable locking engagement of the stroller tray 10 to the stroller 2.

To prevent rotation of the stroller tray 10 relative to the mount 22, the connector assembly 20 has a generally oval or oblong cross-sectional shape (see FIG. 7), while the socket 38 is similarly dimensioned to receive the connector assembly 20 and to prevent the connector assembly 20 from rotating within the socket 38. Additionally, the arm 14 includes a projection 40 that mates with another corresponding socket 42 when the connector assembly 20 is fully inserted into the socket 38. The projection 40 provides additional strength and/or support to the stroller tray 10, and assists in the prevention of relative movement between the stroller tray 10 and the mount 22. In this example, the projection 40 is riveted to the underside of the arm 14 by the rivets 17. However, any other suitable shape and/or device may be employed to provide additional support and/or to prevent the connector assembly 20 from unintentionally rotating within socket 38, and furthermore, the projection 40 may be integrally formed with the stroller tray 10 or coupled to the stroller tray 10 by any suitable device.

FIG. 8 illustrates the connector assembly 20 of the stroller tray 10 being inserted into and/or removed from the corresponding socket 38 of the mount 22 on the stroller 2. As the connector assembly 20 is inserted, the push button 36 is forced inward toward a retracted position. Once the connector assembly 20 is fully inserted into the socket 38 and the arm 14 abuts the mount 22, the push button 36 aligns with the aperture in the side wall (not shown) of the socket 38 and, thus, moves under the influence of its spring bias to an extended position within the aperture. Additionally, the projection 40 mates with the socket 42 to assist in supporting the stroller tray 10 and in preventing relative rotational movement between the stroller tray 10 and the mount 22. Removal is conveniently achieved by depressing a release button 44, which in turn depresses the push button 36 until it is free of the aperture, and then withdrawing the connector assembly 20 of the stroller tray 10 from the socket 38 of the mount 22 on the stroller 2. The release button 44 is positioned adjacent the aperture in juxtaposition with the push button 36 when the tray 10 is totally inserted into the socket 38.

While the mount 22 shown in FIGS. 1-8 illustrates one example method of mounting the stroller tray 10 to a stroller 2, the tray 10 and the mount 22 may be constructed and coupled in other ways. For example, the socket 38, or other similar type socket and/or mounting method may be located in a different location along a stroller frame member, or any other connecting assemblies may be used. Such alternative assemblies may utilize constructions having different connecting portions and/or releasable locking assemblies.

Additionally, strollers commonly are constructed to be collapsible for storage or transportation when not in use. In some instances, it may be desirable to fold the stroller tray 10 compactly as well. For example, to avoid having to remove the stroller tray 10 when folding the stroller 2 to a collapsed position, an alternative stroller tray 10' incorporates a pivotal connection between the tray portion 12' and the arm 14'. An example of this alternative stroller tray 10' is shown in FIGS. 10-12.

Figure 10:
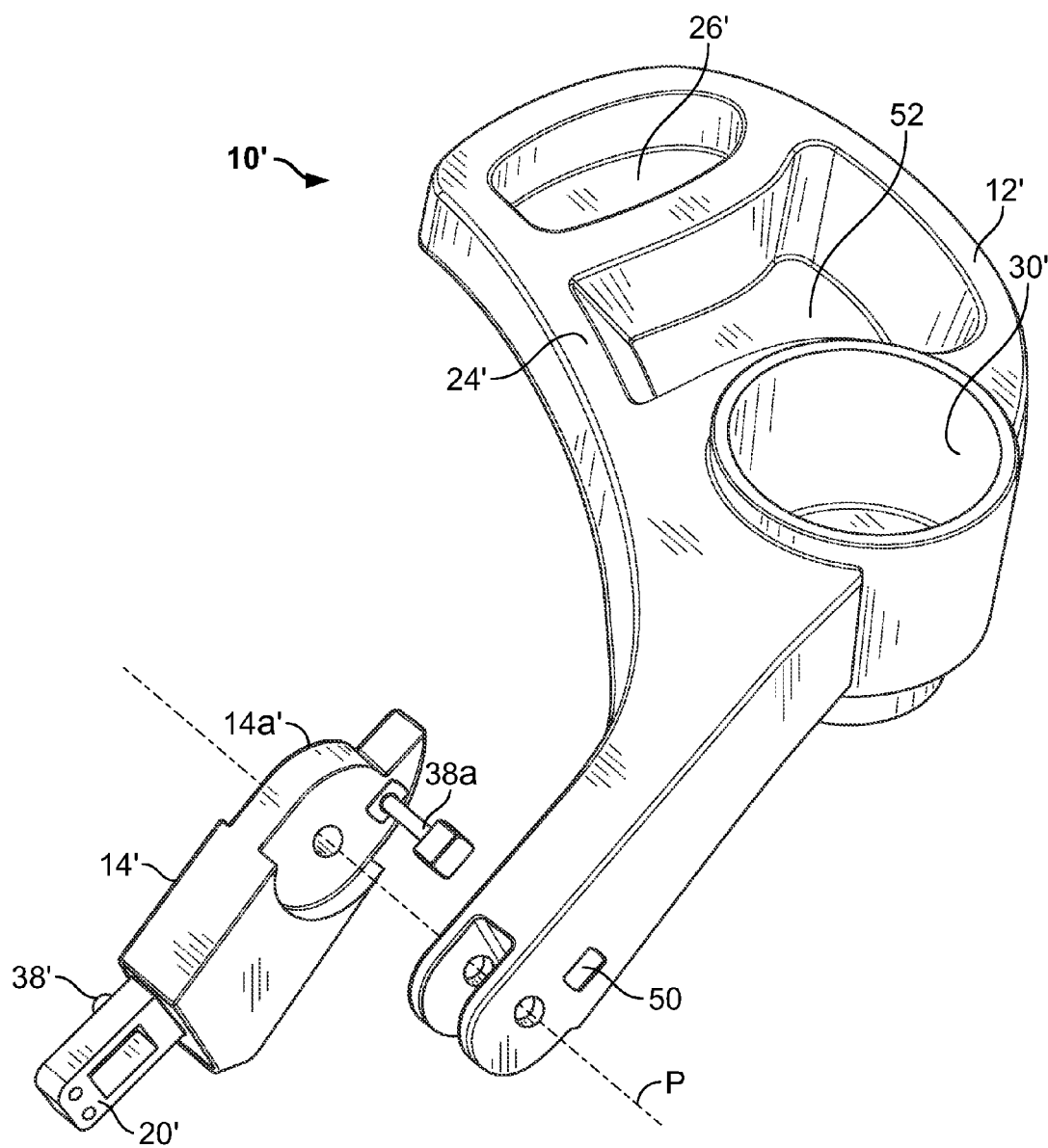
FIG. 10 is a perspective exploded view of another example stroller tray.
Figure 11:
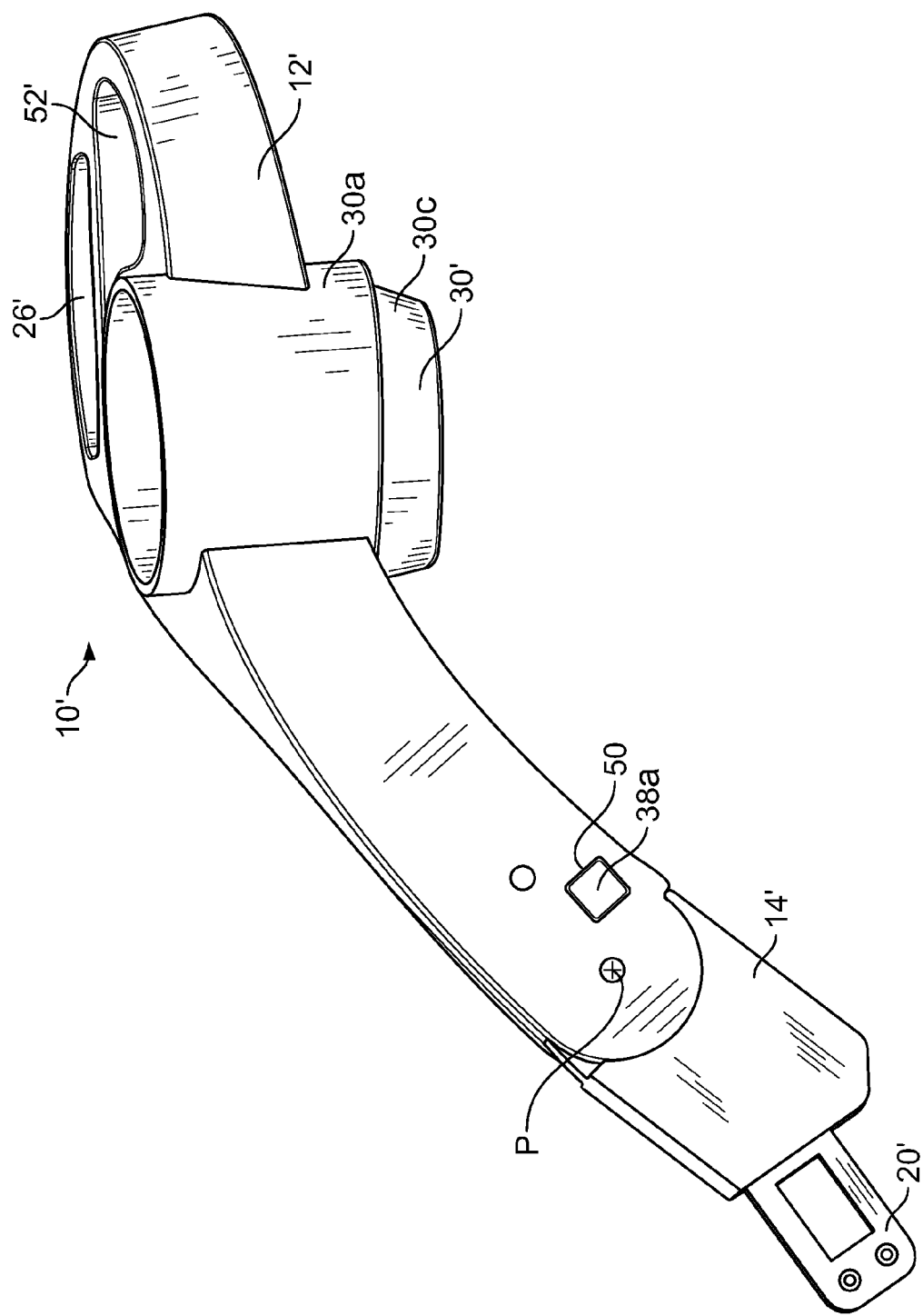
FIG. 11 is right side view of the example stroller tray of FIG. 10, showing the tray in an in-use configuration.
Figure 12:
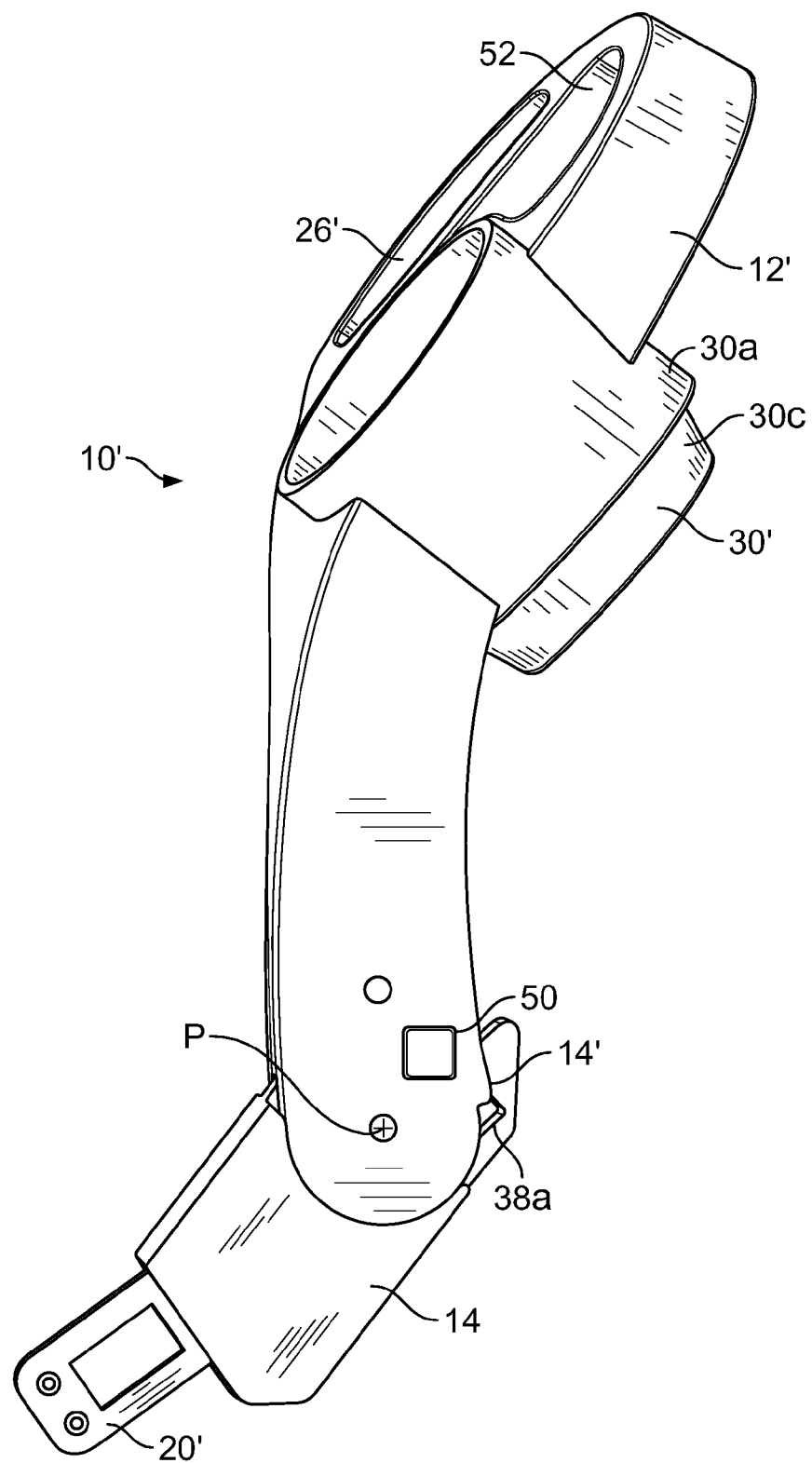
FIG. 12 is right side view of the example stroller tray of FIG. 10, but showing the tray in a folded configuration.

As illustrated in the example of FIGS. 10-12, the example stroller tray 10' includes a connector assembly 20' integrally formed with an arm 14'. The connector assembly 20' will be insertable into a corresponding female connector (not shown) mounted on the stroller 2. The connector assembly 20' includes a spring-biased push button 38' that operates similarly to the push button 38 to secure the stroller tray 10' to the stroller 2. In addition to the spring-biased push button 38' associated with the connector assembly 20' at the lower end of the arm 14', an upper end of the arm 14' includes a second spring-biased push button 38'. The second push button 38a is dimensioned to be received in an aperture 50 at the lower end of the tray 12'. When the second push button 38a is received in the aperture 50, as shown in FIG. 11, the stroller tray 10' is secured in a position for use (FIG. 11). When the second push button 38a is depressed, the tray portion 12' may be pivoted relative to the arm 14', about a pivot axis P as shown in FIG. 12. The pivoted position may be helpful in attaining a more compact collapsed position of the stroller 2 while the stroller tray 10' remains mounted to the stroller 2.

The tray portion 12' of the example stroller tray 10' in FIGS. 10-12 includes a cup holder 30', a recessed area 26', a surface 24', and a second recessed area 52 forming a second storage area. The recessed areas 26' and 52 may be similar to the recessed area 26 and utilized as an entertainment device holder, a snack tray, or any other suitable purpose.

Because a typical tray assembly provides the passive restraint functionality, the ingress or egress of a child into or out of the seat of the stroller is oftentimes impeded. For example, to place a child into, or remove a child from the seat of a stroller having a tray extending fully across the frame, the child's legs must pass between the seat and the bottom of the tray. For safety reasons, however, this gap is sometimes just a few inches in height (e.g., less than four inches), and can lead to difficulty in passing the child's legs through the gap.

To alleviate this difficulty, some stroller trays are designed to provide a larger gap between the tray and the seat. Larger gaps, however, can lead to head entrapment issues for a child that shifts in the stroller seat. Therefore, the gap must be made especially large (e.g., greater than eight inches), to allow a child's torso and head to fully pass through the gap if the child shifts in the seat. This larger gap size, however, can lead to a bulkier tray and can cause difficulty in folding the stroller. Additionally, the large gap size can be disadvantageous as a small child may not be able to utilize the tray surface, and/or enjoy the entertainment supported by the tray.

The disclosed examples provide a stroller tray that is ergonomically designed and includes a larger gap to allow ingress and egress into and from the stroller seat, and yet it close enough to the seat so that a small child can utilize the tray, and still avoid any safety or entrapment issues if a child should shift in the seat. Because the tray extends only partially across the seat, a parent has easier access to a child in the seat, and a child may not feel claustrophobic in the seating area of the stroller. Further, it is easier to place a child in and/or remove a child from the seat than in strollers with trays that extends completely from one side to the other side of the stroller. Such easy access to the seating area makes it easy to remove a sleeping child from the stroller without waking him/her. It also makes it easy to clean the seat from food or drink spills.

Further, the stroller trays 10, 10' makes it possible for larger children to climb in and/or out of the stroller seat without requiring lifting of the child by the parent or care giver. The seat is preferably provided with a seat belt or other harness to prevent the child from inadvertently falling out of the seat and/or from intentionally leaving the seat area without the consent of the caregiver.

All of these benefits are obtained without removal of the trays 10, 10' from the stroller 2. Indeed, no movement of the illustrated example trays 10, 10' is required to provide access to or exit from the seat at all. Thus, because there is no requirement to move or remove the tray from the stroller to access the seat, there is little risk of the tray being misplaced and/or damaged during entry to or exit from the seat area.

Although certain example methods and apparatus have been described herein, the scope of coverage of this patent is not limited thereto. On the contrary, this patent covers all methods, apparatus and articles of manufacture fairly falling within the scope of the appended claims either literally or under the doctrine of equivalents.

We claim:

1. A stroller with a tray comprising:
   a stroller frame having a first side, a second side, and a seat for receipt of a child positioned between the first and the second sides;
   a tray mount mounted to only the first side of the stroller frame proximate the seat, the tray mount having a first socket substantially parallel to and adjacent a second socket;
   a stroller tray removably coupled to the tray mount, the stroller tray having a tray portion and an arm, the arm terminating in a connector assembly and a projection substantially parallel to and proximate to the connector assembly, the connector assembly dimensioned to engage the first socket and the projection dimensioned to engage the second socket when the stroller tray is coupled to the tray mount, the connector assembly having an oval or oblong cross-section to prevent the connector assembly from rotating relative to the stroller frame when the arm is coupled to the tray mount; and
   the tray portion being cantilevered on the arm to extend in front of a seat back of the seat, the stroller tray does not extend completely from the first side to the second side of the stroller frame to provide a gap to allow egress and ingress of a child to the seat of the stroller while the stroller tray portion extends in front of the seat and without movement of the tray portion relative to the stroller frame.

2. A stroller as defined in claim 1, wherein the tray portion and the arm are integrally formed.

3. A stroller as defined in claim 1, wherein the tray mount comprises a socket and wherein the connector assembly is dimensioned for mating engagement with the socket.

4. A stroller as defined in claim 1, wherein the stroller tray is removably mounted to the stroller.

5. A stroller as defined in claim 1, wherein the stroller tray extends approximately half the distance from the first side of the stroller frame to the second side.

6. A stroller as defined in claim 1, wherein the tray portion is pivotal relative to the arm for movement between an in-use position and a collapsed position.

7. A stroller as defined in claim 1, wherein a distance between a bottom of the tray portion and a seating surface of the seat directly below the tray bottom is greater than four inches and is less than eight inches.

8. A stroller as defined in claim 3, wherein the connector assembly includes a spring button and the socket includes an aperture in a side wall to receive the spring button to establish a removable locking engagement of the stroller tray to the stroller.

9. A stroller as defined in claim 3, wherein the connector assembly is substantially prevented from rotational movement relative to the socket.

10. A stroller as defined in claim 3, wherein the projection is to engage a second aperture defined by the tray mount adjacent the socket to substantially prevent rotational movement of the arm relative to the tray mount.

11. A stroller as defined in claim 6, wherein the arm further comprises a spring button shiftable between a locked position to prevent pivotal movement of the tray portion and an unlocked position to permit pivotal movement of the tray portion.

12. A stroller with a tray comprising:
    a stroller frame having a first side, a second side, and a seat for receipt of a child positioned between the first and the second sides;
    a tray mount mounted to only the first side of the stroller frame proximate the seat, the tray mount defining a first socket having a first axis and a second socket having a second axis that is substantially parallel relative to the first axis of the first socket;
    a stroller tray operatively coupled to the tray mount, the stroller tray having a tray portion and an arm, the arm terminating in a connector assembly dimensioned for mating engagement with the first socket, the connector assembly having a spring button and the socket including an aperture in a side wall to receive the spring button to establish a removable locking engagement of the stroller tray to the stroller, the connector assembly having an oval or oblong cross-section to prevent the connector assembly from rotating relative to the stroller frame when the arm is coupled to the tray mount; and
    a projection proximate the connector assembly to be received by the tray mount, the projection positioned substantially parallel relative to the connector assembly, the projection to engage the second socket defined by the tray mount adjacent the first socket, and the tray portion being cantilevered on the arm to extend in front of a seat back of the seat, the stroller tray does not extend completely from the first side to the second side of the stroller frame to provide a gap to allow egress and ingress of a child to the seat of the stroller while the stroller tray portion extends in front of the seat and without movement of the tray portion relative to the stroller frame, wherein the projection provides structural support to cantilever the tray portion on the arm.

13. For use with a stroller having a stroller frame including a first side, a second side, and a seat for receipt of a child, a tray comprising:
    an arm that includes a connector assembly and a projection attached to the connector assembly, the projection having a first longitudinal axis that is substantially parallel to a second longitudinal axis of the connector assembly;
    a tray portion cantilevered on the arm such that when mounted to the stroller frame, the tray portion extends in front of or over a portion of the seat of the stroller frame, the stroller tray does not extend completely from the first side of the stroller frame to the second side; and a tray mount carried by the stroller frame, the tray mount having a first socket to receive the connector assembly of the arm to couple the tray portion to the stroller frame and a second socket proximate the first socket to receive the projection to substantially prevent rotational movement of the support arm relative to the tray mount, the first socket having an axis that is substantially parallel to an axis of the second socket.

14. A tray as defined in claim 13, wherein the connector assembly is dimensioned for mating engagement with the first socket.

15. A tray as defined in claim 13, wherein the projection provides structural support to cantilever the tray portion on the arm.

16. A tray as defined in claim 13, wherein the stroller tray extends approximately half the distance from the first side of the stroller frame to the second side.

17. A tray as defined in claim 13, wherein the tray portion is pivotal relative to the arm for movement between an in-use position and a collapsed position.

18. A tray as defined in claim 14, wherein the connector assembly includes a biased push button and the first socket includes an aperture in a side wall to receive the push button to establish a removable locking engagement of the stroller tray to the stroller.

19. A tray as defined in claim 18, wherein the connector assembly is substantially prevented from rotational movement relative to the first socket.

20. A tray as defined in claim 19, wherein the connector assembly includes an oblong cross section.

21. A stroller as defined in claim 17, wherein the arm further comprises a spring button shiftable between a locked position to prevent pivotal movement of the tray portion and an unlocked position to permit pivotal movement of the tray portion.

22. A method of mounting a tray to a stroller comprising:

inserting a first end of a tray arm having a connector into a first socket of a tray mount associated with a stroller frame, the first socket defining a first longitudinal axis;

depressing a spring button positioned on the connector, the button having an axis that is not parallel to a longitudinal axis of the connector;

inserting a projection terminating at the first end of the tray arm adjacent the connector into a second socket of the tray mount associated with the stroller frame, the second socket defining a second longitudinal axis substantially parallel to and adjacent the first longitudinal axis of the first socket, the connector being substantially parallel to and adjacent the projection; and continuing to insert the first end of the tray arm and the projection into the respective first and second sockets of the tray mount until the spring button extends into an aperture on the tray mount to cantilever the tray from only one side of the stroller frame, wherein the tray extends partially between a first side of the stroller in which the tray arm is mounted and a second side of the stroller opposite the first side to provide a gap between an end of the tray opposite the tray arm and the second side of the frame to allow egress and ingress of a child relative to the seat while the tray is coupled to the stroller frame and while the position of the tray is fixed relative to the stroller frame.

23. A method of mounting a tray as defined in claim 22, further comprising pivoting the tray arm to move the tray between an in-use position and a collapsed position.

24. A method of mounting a tray as defined in claim 22, wherein the tray extends approximately half the distance from the one side of the stroller frame to an opposite side of the stroller frame.

25. A stroller with a tray comprising:

a stroller frame having a first side, a second side, and a seat positioned between the first and the second sides;

a tray mount mounted to the stroller frame, the tray mount having a first socket immediately adjacent a second socket; and a stroller tray supported by the tray mount and having a tray portion and an arm, the arm having a connector and a projection attached to the connector, the connector being non-flexible relative to the projection and the arm, the first socket of the tray mount to receive the connector and the second socket of the tray mount to receive the projection while the first socket receives the connector, the tray portion being cantilevered on the arm to extend in front of or over a portion of the seat, the stroller tray not extending completely from the first side to the second side of the stroller frame, a distance between a bottom of the tray portion and a seating surface of the seat directly below the tray bottom being greater than four inches and less than eight inches.

* * * * *